United States Patent
Kampe et al.

(10) Patent No.: US 11,488,274 B2
(45) Date of Patent: Nov. 1, 2022

(54) FRONTLINE ALERTING SERVICE TOOL

(71) Applicant: Frito-Lay North America, Inc., Plano, TX (US)

(72) Inventors: Brian C. Kampe, Frisco, TX (US); Kimberly D. Schimick, Garden Ridge, TX (US); Andrew T. Smith, Plano, TX (US); John S. Phillips, Purchase, NY (US)

(73) Assignee: Frito Lay North America, Inc., Plano, TX (US)

( * ) Notice: Subject to any disclaimer, the term of this patent is extended or adjusted under 35 U.S.C. 154(b) by 0 days.

(21) Appl. No.: 16/892,992

(22) Filed: Jun. 4, 2020

(65) Prior Publication Data

US 2021/0383495 A1    Dec. 9, 2021

(51) Int. Cl.
| | |
|---|---|
| *G06Q 50/28* | (2012.01) |
| *G06Q 10/06* | (2012.01) |
| *G06Q 30/02* | (2012.01) |

(52) U.S. Cl.
CPC ....... *G06Q 50/28* (2013.01); *G06Q 10/06315* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS

| | | | | |
|---|---|---|---|---|
| 9,672,489 B1* | 6/2017 | Kangas | ................ | G06Q 10/087 |
| 2006/0020366 A1* | 1/2006 | Bloom | .................. | G06Q 20/00 |
| | | | | 700/226 |
| 2013/0282433 A1* | 10/2013 | Richardson | ............ | G06Q 30/02 |
| | | | | 705/7.31 |
| 2018/0374127 A1 | 12/2018 | Walden et al. | | |
| 2019/0149725 A1* | 5/2019 | Adato | .................... | G06V 20/17 |
| | | | | 348/158 |
| 2019/0236528 A1* | 8/2019 | Brooks | .............. | G06K 7/10386 |
| 2020/0167721 A1 | 5/2020 | Nakdimon et al. | | |

OTHER PUBLICATIONS

Retail Solutions, Inc (RSi). "Global Snack Company Reduces OOS and Improves OSA at Large US Retailer," case study. 2018. Available at: http://www.retailsolutions.com/wp-content/uploads/2018/10/Retail-Solutions-Reduced-OOS-and-Improved-OSA-Case-Study.pdf. Accessed Apr. 6, 2020.
International Search Report and Written Opinion issued in PCT/US2021/031178 dated Aug. 20, 2021.

* cited by examiner

*Primary Examiner* — Arif Ullah
(74) *Attorney, Agent, or Firm* — Barnes & Thornburg LLP; G. Peter Nichols (57) ABSTRACT

An inventory tracking system includes an analytic device communicatively connected with a plurality of data sources and a field device. The analytic device includes a processor configured to, in response to determining based on input data from at least one of the plurality of data sources that a criteria for issuing a planogram (POG) void alert has been met, cause the field device to display a notification indicative of the POG void alert, and, in response to determining based on data indicating user input to the field device that the issued POG void alert was invalid, update the criteria for issuing the POG void alert, such that a subsequent POG void alert is issued according to the updated criteria.

18 Claims, 7 Drawing Sheets

FRONTLINE ALERTING SERVICE TOOL

TECHNICAL FIELD

The present disclosure generally relates to an inventory tracking and update system and, more particularly, to systems and methods for updating restock alerts based on field agent input.

BACKGROUND

Planograms (POGs), or visual representations of product in a retail environment, are effective tools for increasing sales, managing inventory and otherwise ensuring that the desired quantity of objects are placed to optimize profits or other parameters. For example, a planogram, also referred to as a modular (MOD), may describe where in the retail environment and in what quantity products should be located.

Retail inventory tracking includes manual or automated processes that help monitor the retail space, including shelf and display layout and stock levels, to ensure close correspondence to a desired planogram. Such regular monitoring processes may be configured to identify when one or more products are absent from their designated POG position on the shelf or display. From a manufacturer's perspective, such instances of absent items, or POG voids, may result in missed sales opportunities and risk customer and retailer dissatisfaction.

SUMMARY

An inventory tracking system includes an analytic device communicatively connected with a plurality of data sources and a field device. The analytic device includes a processor configured to, in response to determining based on input data from at least one of the plurality of data sources that a criteria for issuing a planogram (POG) void alert has been met, cause the field device to display a notification indicative of the POG void alert; and in response to determining based on data indicating user input to the field device that the issued POG void alert was invalid, update the criteria for issuing the POG void alert, such that a subsequent POG void alert is issued according to the updated criteria.

A method includes, by a processor, in response to determining, based on input data from at least one of a plurality of data sources, that a criteria for issuing a planogram (POG) void alert has been met, causing a field device to display a notification indicative of the POG void alert, and in response to determining, based on data indicating user input to the field device, that the issued POG void alert was invalid, updating the criteria for issuing the POG void alert, such that a subsequent POG void alert is issued according to the updated criteria.

A field device including a processor communicatively connected to a user interface. The processor being configured to, in response to receiving data indicating issuance of a planogram (POG) void alert based on an initial criteria for issuing the POG void alert, display on the user interface a first notification of the issued POG void alert. The processor being configured to, in response to user input via the user interface related to the displayed first notification and indicating that the issued POG void alert was invalid, transmit data indicative of the user input to a remote analytic device to cause the remote analytic device to update the initial criteria to generate an updated criteria, and in response to receiving data indicating issuance of a subsequent POG void alert based on the updated criteria, display on the user interface a second notification of the subsequent issued POG void alert.

BRIEF DESCRIPTION OF THE DRAWINGS

The detailed description particularly refers to the following figures, in which.

DETAILED DESCRIPTION

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Given a finite amount of shelf space, stores may use a variety of factors to identify which products to stock and in which quantities. Moreover, once the shelf space has been allotted, retailers may rely on manufacturers to maintain adequate inventory levels by rapidly identifying and resolving low stock and out-of-stock (OOS) occurrences. Inventory tracking methods by the manufacturer and/or retailer may include using sensing systems to detect item location and position and tracking quantities of items stocked, sold, returned, and so on.

To minimize the number of restocking trips to retail locations while ensuring proper stock levels, the manufacturer may track its products by categorizing them as fast-moving, medium-moving, or slow-moving and may plan to restock each product at intervals associated with the product category. However, a given product categorized as fast-moving in a first geographic area may be less popular in a second geographic area and may, therefore, sell at a slower rate. Conversely, a product categorized as medium- or slow-moving in one location or store may be more popular in another location or store and may sell out quicker than expected for medium- or slow-moving categories of products. Accordingly, the manufacturer may supplement planned restocking schedule with one or more alerts (e.g., POG void alerts) issued when a quantity of the product sold within a predefined period is either greater than or less than a quantity expected to have been sold within the predefined period associated with the category of the product. As another example, the POG void alerts may be issued when a sensing system identifies that a product has been removed, or is otherwise absent, from its shelf location resulting in a planogram void (e.g., an empty space where a product or an item is expected to be according to the planogram).

For a variety of reasons, at least a portion of issued POG void alerts may be inaccurate. The retailer and shopper practices may cause items to be incorrectly shelved, moved or shifted such that the items become hidden behind other items on the shelf, or other such reasons. This may cause the sensing system to incorrectly identify the item as needing to be restocked and/or may cause the item to sell slower because consumers cannot locate or access it. The described systems and methods may assist in improving the accuracy of POG void alerts.

Figure 1:
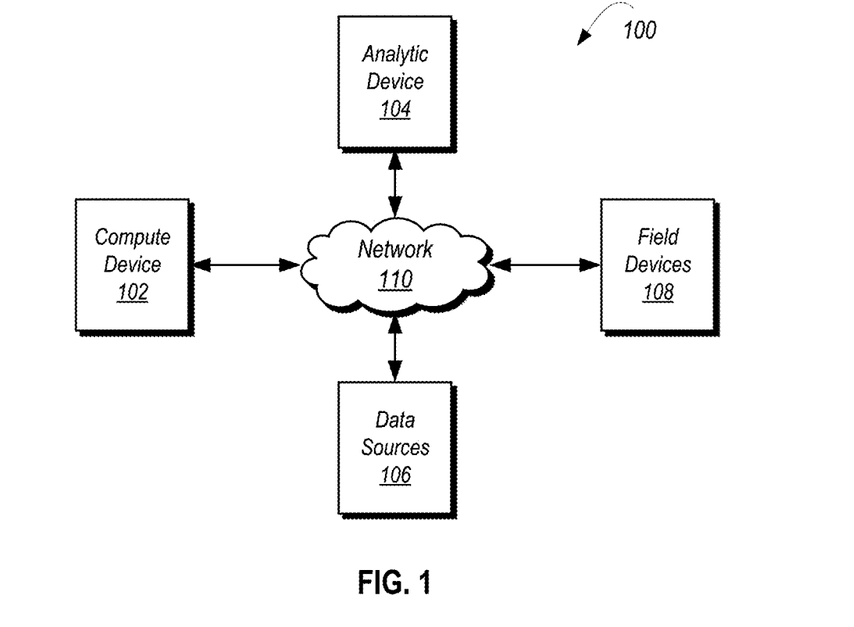
FIG. 1 is a block diagram illustrating a smart inventory tracking system.

Referring now to FIG. 1, a system 100 includes a compute device 102 communicatively coupled, via a network 110, to an analytic device 104. The network 110 may be embodied as any type of network capable of communicatively connecting the compute device 102 and the analytic device 104, such as a cloud network, an Ethernet-based network, etc. Accordingly, the network 110 may be established through a series of links/interconnects, switches, routers, and other network devices which are capable of connecting the compute device 102 and the analytic device 104 of the network 110. As will be described in further detail below (see, e.g., FIG. 3), the compute device 102 and the analytic device 104 form a comprehensive data processing, analysis, and exchange system.

The compute device 102 and the analytic device 104 are communicatively coupled to at least one of a plurality of data sources 106. As will be described in further detail below (see, e.g., FIG. 3), the data sources 106 comprise a variety of sources of data related to establishing a status of one or more inventory items, products, or other merchandise units. At least one of the data sources 106 transmits data to the compute device 102. Once received, the compute device 102 may process the data (e.g., clean, harmonize, organize, prioritize, arrange in a hierarchy, categorize according to one or more attributes, etc.) prior to transmitting the data to the analytic device 104.

At least one of the data sources 106 transmits data directly to the analytic device 104. Once received, the analytic device 104 may perform analytics processes based on, or using, the received source data. The results of the analytics analysis output by the analytic device 104 may then be used for various purposes. For instance, the analytic device 104 may transmit the results of the analytics processes to the compute device 102 for distribution to the field devices 108. While not illustrated separately, the analytic device 104 may comprise (or be communicatively connected to) a data aggregation service, e.g., that executes on the network 110.

The data sources 106 may be embodied as any type of device capable of performing the functions described herein, including, but not limited to, a sensor (e.g., a motion sensor, a location sensor, a positioning sensor, etc.), a smart barcode, a beacon providing a product status (e.g., reporting remotely, detected by a reader, etc.). The compute device 102 and the analytic device 104 are communicatively coupled to at least one of a plurality of field devices 108.

Each of the compute device 102 and the analytic device 104 may be embodied as any type of compute device capable of performing functions, including, but not limited to, a compute device, a storage device, a server (e.g., stand-alone, rack-mounted, blade, etc.), a sled (e.g., a compute sled, an accelerator sled, a storage sled, etc.), an enhanced network interface controller (NIC), a network appliance (e.g., physical or virtual), a router, a web appliance, a distributed computing system, a processor-based system, and/or a multiprocessor system.

Figure 2:
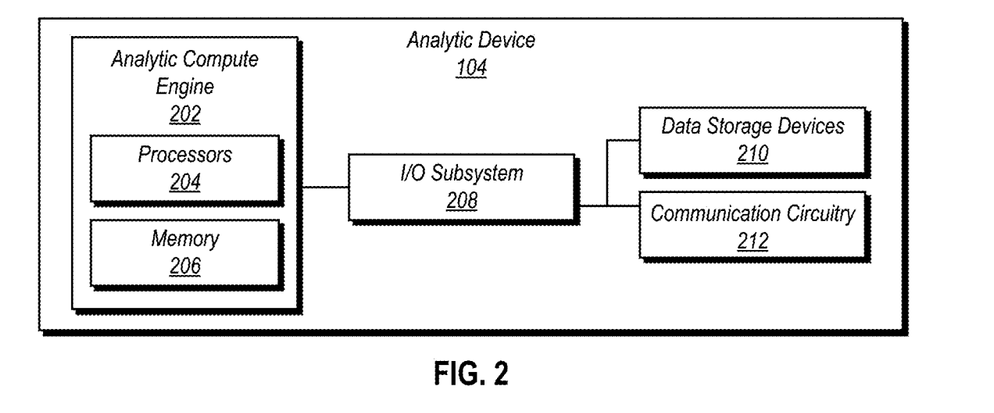
FIG. 2 is a block diagram illustrating a compute device of the system of FIG. 1.

FIG. 2 illustrates an exemplary implementation 200 of the analytic device 104. While the illustrated implementation 200 describes only the analytic device 104, in other examples, the compute device 102 may be embodied to include similar components configured to perform similar operations to those described, with respect to the analytic device 104. The analytic device 104 includes an analytic compute engine 202, an I/O subsystem 208, one or more data storage devices 210, and communication circuitry 212. It will be appreciated that the analytic device 104 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The analytic compute engine 202 may be embodied as any type of device or collection of devices capable of performing the described various compute functions. In some embodiments, the analytic compute engine 202 may be embodied as a single device, such as an integrated circuit, an embedded system, a field-programmable gate array (FPGA), a system-on-a-chip (SOC), an application-specific integrated circuit (ASIC), reconfigurable hardware or hardware circuitry, or other specialized hardware to facilitate performance of the functions described herein. In some embodiments, the analytic compute engine 202 may include, or may be embodied as, one or more processors 204 (i.e., one or more central processing units (CPUs)) and memory 206.

The processor(s) 204 may be embodied as any type of processor capable of performing the described functions. For example, the processor(s) 204 may be embodied as one or more single-core processors, one or more multi-core processors, a digital signal processor, a microcontroller, or other processor or processing/controlling circuit(s). In some embodiments, the processor(s) 204 may be embodied as, include, or otherwise be coupled to an FPGA, an ASIC, reconfigurable hardware or hardware circuitry, or other specialized hardware to facilitate performance of the described functions.

The memory 206 may be embodied as any type of volatile (e.g., dynamic random access memory (DRAM), etc.) or non-volatile memory or data storage capable of performing the described functions. It will be appreciated that the memory 206 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as DRAM or static random access memory (SRAM).

The analytic compute engine 202 is communicatively coupled to other components of the compute device 102 via the I/O subsystem 208, which may be embodied as circuitry and/or components to facilitate input/output operations with the processor 204, the memory 206, and other components of the compute device 102. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of a system-on-a-chip (SoC) and be incorporated, along with the analytic compute engine 202 (e.g., the processor 204, the memory 206, etc.) and/or other components of the analytic device 104, on a single integrated circuit chip.

The one or more data storage devices 210 may be embodied as any type of storage device(s) configured for short-term or long-term storage of data, such as, for example, memory devices and circuits, memory cards, hard disk drives, solid-state drives, or other data storage devices. Each data storage device 210 may include a system partition that stores data and firmware code for the data storage device 210. Each data storage device 210 may also include an operating system partition that stores data files and executables for an operating system.

The communication circuitry 212 may be embodied as any communication circuit, device, or collection thereof, capable of enabling communications between the analytic device 104 and other computing devices, such as the compute device 102, the data sources 106, the field devices 108, etc., as well as any network communication enabling devices, such as a gateway, an access point, other network switches/routers, etc., to allow ingress/egress of network traffic. Accordingly, the communication circuitry 212 may be configured to use any one or more communication technologies (e.g., wireless or wired communication technologies) and associated protocols (e.g., Ethernet, Bluetooth®, WiMAX®, LTE, 5G, etc.) to effect such communication.

It should be appreciated that, in some embodiments, the communication circuitry 212 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the compute device 102, etc.), performing computational functions, etc.

In some embodiments, performance of one or more of the functions of the described communication circuitry 212 may be performed by specialized circuitry, hardware, or combination thereof of the communication circuitry 212, which may be embodied as a system-on-a-chip (SoC) or otherwise form a portion of a SoC of the compute device 102 (e.g., incorporated on a single integrated circuit chip along with a processor 204, the memory 206, and/or other components of the compute device 102). Alternatively, the specialized circuitry, hardware, or combination thereof may be embodied as one or more discrete processing units of the compute device 102, each of which may be capable of performing one or more of the described functions.

Figure 3:
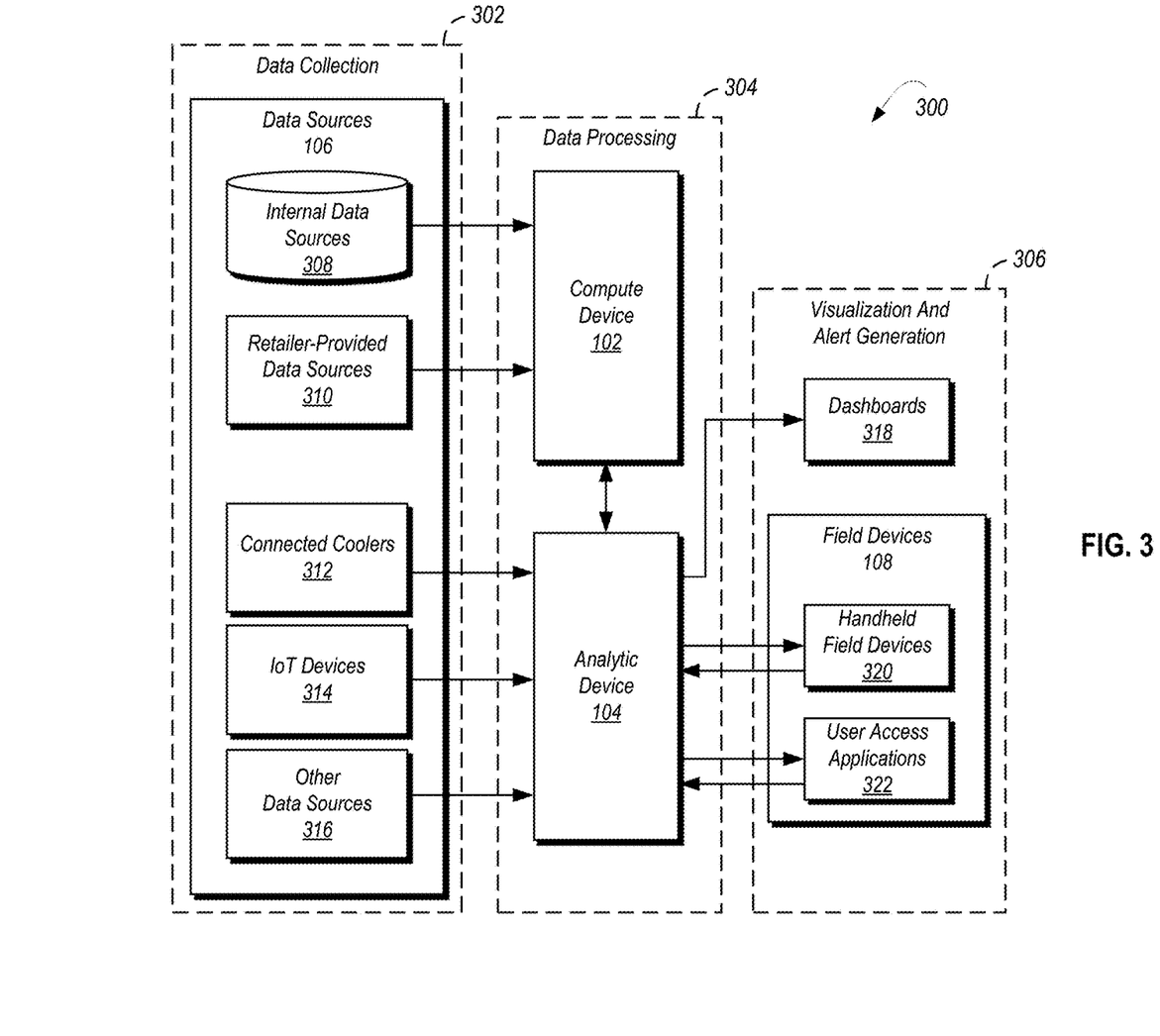
FIG. 3 is a block diagram illustrating an exemplary data flow of the system of FIG. 1.

FIG. 3 illustrates an exemplary implementation 300 of the smart inventory tracking system 100. Data collection operations 302 include collecting data provided by the data sources 106. As described in reference to at least FIG. 1, data from one or more data sources 106 is provided to the compute device 102 and the analytic device 104 for further processing. Exemplary data sources 106 include internal data source(s) 308, retailer-provided data source(s) 310, connected cooler(s) 312, Internet of Things (IoT) device(s) 314, and other data source(s) 316. It is contemplated that one or more data sources 106 provide data to the compute device 102 and/or to the analytic device 104 in real-time, e.g., near-simultaneous manner, or using time-delayed methodology, e.g., periodic or aperiodic manner, on at least one of a continuous and time-varying basis. Moreover, a given data source 106 may use one or a combination of aforementioned data transfer methodologies and cadences and may switch among the various methodologies and cadences in a course of operation. Additionally or alternatively, data source(s) 106 may provide demand-based information updates in response to a corresponding update request from at least one of the compute device 102 and the analytic device 104.

Internal data source(s) 308 comprise digital and non-digital data structures maintained by a manufacturer, producer, or distributor in a regular course of business. Internal data source(s) 308 include databases, spreadsheets, ledgers, receipts, invoices, and other documentation types indicating manufacturer production and/or movement of inventory, such as, orders, sales, shipments, deliveries, and returns. Retailer-provided data source(s) 310 comprise digital and non-digital types of records maintained by a retailer in a regular course of business. Retailer-provided data source(s) 310 include databases, spreadsheets, ledgers, receipts, invoices, and other documentation types indicating changes in inventory levels and movement of merchandise, such as, orders, sales, shipments, deliveries, and returns. While internal data source(s) 308 and retailer-provided data source(s) 310 are illustrated as separate data source(s) 106, an exemplary implementation of the system 100 may include incorporating the retailer-provided data source(s) 310 to be a part of internal data source(s) 308 and vice versa. Internal data source(s) 308 and retailer-provided data source(s) 310 serve as input data source(s) 106 to the compute device 102. In other exemplary implementations of the system 100, one or more of the internal data source(s) 308 and retailer-provided data source(s) 310 serve as a direct input to the analytic device 104.

Each of connected cooler(s) 312, IoT device(s) 314, and other data source(s) 316 is communicatively coupled to the analytic device 104 and configured to provide data to the analytic device 104. Connected cooler(s) 312 may be embodied as any type of device or collection of devices capable of performing the various described functions. Connected cooler(s) 312 may comprise smart appliance(s), container(s), or compartment(s) including one or more sensors and compute devices configured to actively monitor, track, and report inventory levels to the analytic device 104. Such appliance(s), container(s), or compartment(s) may be known as "smart" because they include some amount of processing power. Connected cooler(s) 312 may comprise appliance(s) or container(s) housed and maintained within a manufacturer/producer facility, a retail/distribution facility, or a combination thereof.

IoT device(s) 314 may be embodied as any type of device or collection of devices capable of performing various functions, including, but not limited to, automatic identification and data capture (AIDC) technology-based devices, such as radio frequency identification (RFID) tags, beacons, and smart barcodes. IoT device(s) 314 may embody, or operate as a part of, a larger intelligent asset management system that includes transmitters, receivers, antennae, readers and scanners communicatively connected to one or more servers for processing, storing, and distributing data captured by the IoT device(s) 314. Other data source(s) 316 may be embodied as any type of device, system, and data structure or collection of devices, systems, and data structures capable of performing functions, including, but not limited to, traceability, identification, positioning, security, monitoring, and tracking devices, systems, inventory control and feedback, and data structures.

As described in reference to FIGS. 1 and 2, data processing operations 304 may be performed by at least one of the compute device 102 and the analytic device 104. In example implementations of the system 100, the compute device 102 is communicatively coupled to the analytic device 104 and configured to transmit data to the analytic device 104 and to receive data from the analytic device 104.

Analytic device 104 is capable of generating output(s) to support data visualization and alert generation operations 306. Operations 306 may be performed by way of one or more software application-based dashboard(s) 318 monitored and operated by the manufacturer/producer, distributor, and other parties. Data visualization and alert generation operations 306 may be further performed by the field device(s) 108. Field device(s) 108 may be embodied by any device or collection of devices such as, but not limited to, handheld field device(s) 320 and user access application(s) 322 capable of performing the various described functions.

Handheld field device(s) 320 may be embodied as any device or collection of devices capable of performing various functions, such as, but not limited to, a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a consumer electronic device, a digital television device, and/or any other computing device. Exemplary handheld field device(s) 320 include one or more audio and visual output devices, such as, but not limited to, speakers and displays, and one or more audio and visual input devices, such as, but not limited to, microphones and cameras. Example handheld device(s) 320 may receive user input using one or more user input interfaces, such as, but not limited to, touch screens, touch pads, digital and/or physical buttons, keys, and keyboards. Additionally or alternatively, handheld device(s) 320 may be configured to perform speech, face, and hand gesture recognition and/or receive user input by way of voice commands, stylus inputs, single- or multi-touch gestures, and touchless hand gestures.

User access application(s) 322 may be embodied as any computer program or collection of computer programs capable of performing various described functions. User access application(s) 322 includes interface accessible via one or more mobile or stationary user access systems, such as, but not limited to, a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a consumer electronic device, a digital television device, and/or any other computing device.

As further described in reference to at least FIGS. 4A-4D, the analytic device 104 is capable of generating output(s), such as a visual or audio alert, indicating a status of one or more items of inventory. The analytic device 104 may generate an alert in response to analytic processes of data received from the data source(s) 106 indicating that inventory of a given item or product at a certain retail location is either greater than or less than a predefined inventory level. The analytic device 104 may track various items or products based on a previously assigned category or type, such as fast-moving, medium-moving, or slow-moving. A fast-moving product may be a product popular among a broad range of consumers and may be in high demand, a medium-moving product may be a product moderately popular and generating a steady demand, and a slow-moving product may be a product popular among a small portion of consumers that generates only a modest demand. In a given predefined period of time, e.g., a week, the manufacturer or retailer may expect to sell different quantities of the fast-, medium-, and slow-moving products. The analytic device 104 may generate an alert, such as a POG void alert, in response to data from the data source(s) 106 indicating that a quantity of fast-, medium-, or slow-moving product sold at a certain retail location within a predefined period is either greater than or less than a threshold quantity.

The manufacturer or retailer may further monitor the fast-, medium-, and slow-moving products over different time periods, such that a given quantity of a fast-moving product may be expected to be sold within a week, while the same quantity of a medium-moving product and a slow-moving product may be expected to sell within a period of two weeks and a month, respectively. Analytic device 104 may generate an alert in response to the quantity of fast-, medium-, or slow-moving product sold at a certain retail location within an associated time period being greater than or less than a threshold quantity expected to have been sold. Of course, the monitoring entity, such as the manufacturer, retailer, and others, may track different quantities of each of the fast-, medium-, and slow-moving products over different time periods and may expect to sell a first quantity of a fast-moving product within a first time period, a second quantity of a medium-moving product within a second time period, and a third quantity of a slow-moving product within a third time period. In such a scenario, analytic device 104 may generate a POG void alert, or another alert, for a fast-moving product in response to detecting that a quantity of the fast-moving product sold within the first time period is greater than or less than the first quantity expected to have been sold.

A given product may be categorized as fast-moving in a first geographic area or at a first retailer, such that a POG void alert is issued when a quantity of the product sold within a predefined period is less than a quantity expected to have been sold within the predefined period associated with the fast-moving product type. The same product may be less popular in a second geographic area or a second retailer and may, therefore, sell at a slower rate. Conversely, a product categorized as slow- or medium-moving may cause a POG void alert to be issued when the quantity sold is greater than a quantity expected to have been sold within the predefined period associated with slow- or medium-moving product category. Thus, POG void alerts generated for the same product based on actual quantities sold as compared to the expected quantities may be inaccurate when applied in the second geographic area. As another example, products identified by the data sources 106 as being absent from a retail shelf, thereby triggering the issuance of a POG void alert, may have been shifted, misplaced, or otherwise became inaccessible or appeared to be out of stock to the customers. Analytic device 104 may update a criteria for issuing a POG void alert in response to user input indicating that the issued alert is invalid. Analytic device 104 may update the criteria by adjusting a tracking time period and/or a quantity of the product expected to be sold within the time period at the second location or the second retailer. The analytic device 104 may update the criteria by adding or modifying one or more parameters measured prior to issuing a POG void alert. The generated alerts may be visually and/or audibly indicated, e.g., via the dashboards 318, the handheld field device(s) 320, and the user access application(s) 322, to a monitoring and operating entity, such as to the manufacturer/producer, distributor, and other parties or systems. In response to the alert, the entity or system monitoring the dashboards 318, the handheld field device(s) 320, and the user access application(s) 322 may initiate one or more actions to correct inventory levels of the item at the identified retail location.

Figure 5:
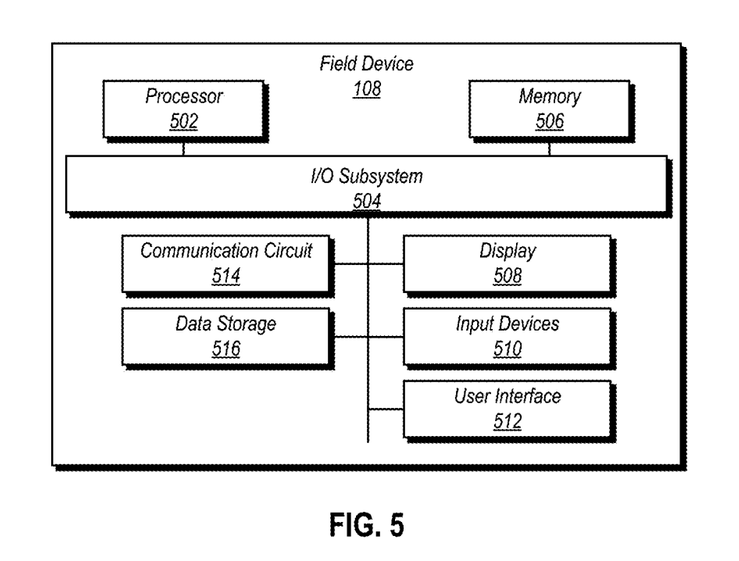
FIG. 5 is a block diagram of a field device useful in the system of FIG. 1.

Referring now to FIG. 5, one of the plurality of the illustrative field devices 108 is shown and it includes a processor 502, an I/O subsystem 504, a memory 506, a display 508, input device(s) 510, a user interface 512, a communication circuit 514, and a data storage 516. Of course, in other embodiments, the field device 108 may include alternative or additional components, such as those commonly found in a server, router, switch, or other network device. Additionally, in some embodiments, one or more of the illustrative components may be incorporated in, or otherwise form a portion of, another component. For example, the memory 506, or portions thereof, may be incorporated in one or more processors 502.

The processor 502 may be embodied as any type of processor capable of performing the described functions. The processor 502 may be embodied as a single or multi-core processor(s), digital signal processor, microcontroller, or other processor or processing/controlling circuit. The memory 506 may be embodied as any type of volatile or non-volatile memory or data storage capable of performing the functions described herein. In operation, the memory 506 may store various data and software used during operation of the field device 108, such as operating systems, applications, programs, libraries, and drivers. The memory 506 is communicatively coupled to the processor 502 via the I/O subsystem 504, which may be embodied as circuitry and/or components to facilitate input/output operations with the processor 502, the memory 506, and other components of the field device 108. For example, the I/O subsystem 504 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 504 may form a portion of a system-on-a-chip (SoC) and be incorporated, along with the processors 502, the memory 506, and other components of the field device 108, on a single integrated circuit chip.

The display 508 may be embodied as any type of display capable of displaying digital information to a user such as a liquid crystal display (LCD), a light emitting diode (LED), a plasma display, a cathode ray tube (CRT), or other type of display device. As described below, the display 508 may be used to display a graphical user interface or other information to the user of the field device 108. Additionally, in some embodiments, the field device 108 may include a touch screen coupled to or incorporated in the display 508. The touch screen may be used to receive user tactile input.

The input device(s) 510 may be embodied as any device or sensor capable of scanning a barcode such as a camera, a scanner, or a reader. The input device(s) 510 may be used by the field device 108 to receive data input regarding inventory item status as discussed in more detail below.

The user interface 512 may be embodied as any type of device or collection of devices capable of facilitating user interaction with the field device 108. For example, the user interface 512 may be embodied as a set of switches, knobs, or the like. Additionally or alternatively, the user interface 512 may include a keyboard and/or mouse. In some embodiments, the user interface 512 may be embodied as a touchscreen.

The communication circuit 514 may be embodied as any communication circuit, device, or collection thereof, capable of enabling communications between the field device 108 and the analytic device 104 and/or the compute device 102 via the network 110. To do so, the communication circuit 514 may be configured to use any one or more communication technology and associated protocols (e.g., Ethernet, Bluetooth®, Wi-Fi®, WiMAX, etc.) to effect such communication.

The data storage 516 may be embodied as any type of device or devices configured for short-term or long-term storage of data such as, for example, memory devices and circuits, memory cards, hard disk drives, solid-state drives, or other data storage devices. The data storage 516 and/or the memory 506 may store various other data useful during the operation of the field device 108.

Figure 6:
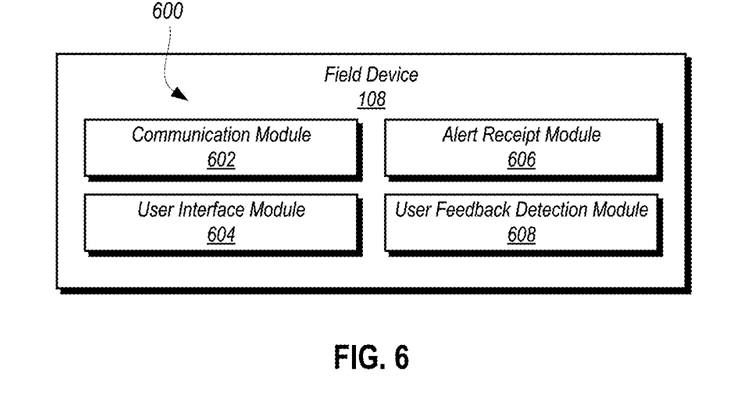
FIG. 6 is a block diagram of an environment created by a field device in the system of FIG. 1.

Referring now to FIG. 6, in use, the field device 108 establishes an environment 600. The illustrative environment 600 includes a communication module 602, a user interface module 604, an alert receipt module 606, and a user feedback detection module 608. Each of the modules and other components of the environment 600 may be embodied as firmware, software, hardware, or a combination thereof. For example the various modules, logic, and other components of the environment 600 may form a portion of, or otherwise be established by, the processor 502, the I/O subsystem 504, an SoC, or other hardware components of the field device 108. As such, in some embodiments, any one or more of the modules of the environment 600 may be embodied as a circuit or collection of electrical devices (e.g., a communication circuit, a user interface circuit, an alert receipt circuit, a user feedback detection circuit, etc.).

The communication module 602 is configured to facilitate communications between the field device 108 and other devices of the system 100. For example, the communication module 602 may establish communication links, via the communication circuit 514, with one or more of the analytic device 104 and/or the compute device 102 to retrieve POG void inventory alerts or share received user feedback regarding a previously generated POG void inventory alert.

The user interface module 604 is configured to provide an interface to a user for interaction with the field device 108. For example, the user interface module 604 may receive user input from the user interface 512 and/or the touchscreen of the display 508. Additionally the user interface module 604 is configured to control or manage the input devices 510. For example, the user interface module 604 may receive or detect inventory item status via the input devices 510 as discussed in more detail below.

The alert receipt module 606 is configured to receive, via the communication module 602, data indicating that a POG void at a certain retail location has been identified and that items may need restocking. The alert receipt module 606 is communicatively coupled to the user interface module 604. Upon receiving a POG void alert from the analytic device 104, the alert receipt module 606 causes the user interface module 604 to update information rendered on the display 508 as discussed in more detail below.

The user feedback detection module 608 is configured to detect that the user entered feedback regarding a previously generated POG void alert. User feedback may be entered using one or more of the user interface 512 and a touch screen connected to the display 508. In an illustrative embodiment, the user feedback detection module 608 interprets data input received via the input device(s) 510 to detect feedback from the user regarding a previously generated POG void alert. The user feedback detection module 608 transmits via the communication module 602 data indicating the received user feedback regarding a previously generated POG void alert to the analytic device 104.

FIGS. 4A-4D illustrate exemplary interfaces of one of the field device(s) 108 of the system 100. The field device(s) 108 illustrated in FIGS. 4A-4D may be the handheld field device(s) 320 communicatively connected with the analytic device 104 that performs data processing operations 304.

Figure 4A:
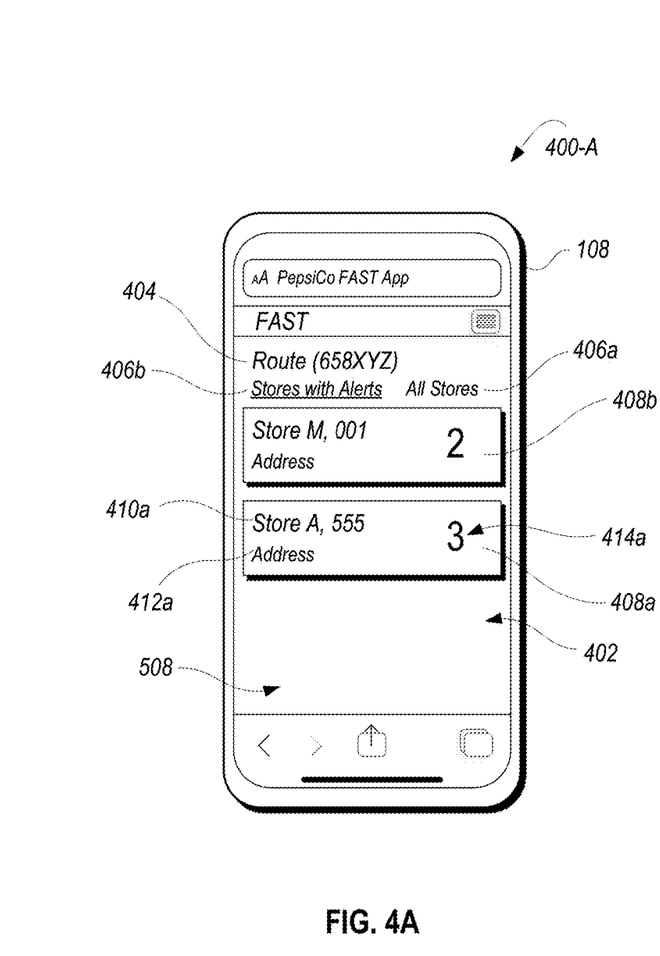
FIGS. 4A-4D are block diagrams illustrating user interface layouts of a field device useful in the system of FIG. 1.

FIG. 4A illustrates an exemplary layout 400-A of a user interface 402 rendered on the display 508 of the field device 108. As discussed previously (see FIG. 5), the display 508 may be a touch screen and may be embodied as any type of touch screen capable of generating input data in response to being touched by the user of the field device 108. The display 508 may be embodied as, for example, a resistive touch screen, a capacitive touch screen, or a camera-based touch screen.

The user interface 402 may be generated by way of an application or a computer program executing on the field device 108. The application or the computer program may be downloadable by a frontline agent from an application distribution platform, such as an application store. An illustrative application may include a one-time user account setup and may be customized to the needs and responsibilities of a given frontline agent, such as, but not limited to, a geographic area managed or overseen by the frontline agent, a product category supported by the frontline agent, a skill category practiced by the frontline agent, etc. During account setup or subsequently, a user of the field device 108 may specify a preference to view POG void alerts for retail locations within a given geographic area.

Upon activation, the application automatically displays system alerts and status updates to the frontline agent via the user interface 402. The layout 400-A of the user interface 402 includes a designated route indication 404, a designated stores list 406a, a designated stores alerts list 406b, and POG void alert indictors 408. Each POG void alert indictor 408 identifies a retail store 410, an associated geographic location 412 of the retail store 410, and a number of active POG void alerts 414. Of course, in other embodiments, layouts 400-A of the field device 108 can include alternative or additional indicators, features, and controls frequently found in UI architecture design, such as checkboxes, radio buttons, dropdown lists, list boxes, buttons, toggles, text fields, date field, breadcrumb, slider, search field, pagination, slider, tags, icons, tooltips, icons, progress bar, notifications, message boxes, and modal windows. Each of the POG void alert indicators 408 may comprise keys or buttons linked to more detailed views, as discussed in more detail below.

An input detection module of the field device 108 may provide an indication to a software application presently executing on the field device 108, such as via an application program interface (API). Accordingly, the software application may perform a desired task based on the indication.

Figure 4B:
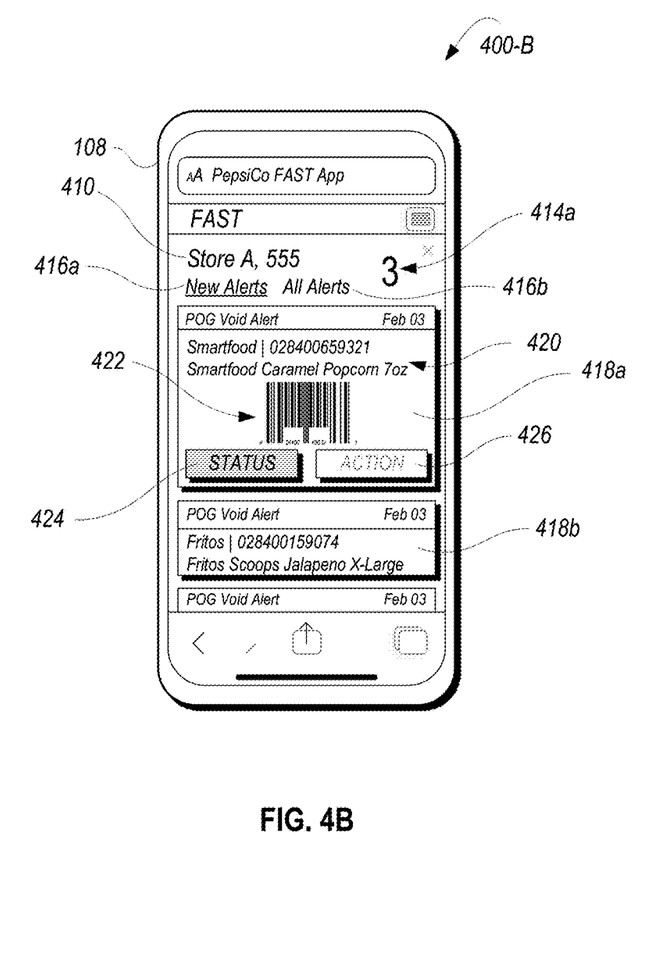

FIG. 4B illustrates an exemplary layout 400-B of the user interface 402 for monitoring and resolving POG void alerts. As with the layout 400-A, the layout 400-B may be rendered on the display 508 of the field device 108. The layout 400-B comprises a detailed view of the POG voids identified within a given retail store location. For example, the layout 400-B may comprise a UI layout accessible following actuation of the POG void alert indicator 408a of the layout 400-A. Of course, in other embodiments, the layout 400-B may be navigated to by way of additional or alternative menu selections and/or invoked automatically in response to download or activation of the software application.

The layout 400-B identifies the retail store 410 where the POG voids have been noted. As one example, upon arriving to the retail store and locating the display or shelf where the POG voids have been reported, a field agent using the field device 108 may navigate to, or otherwise activate, the layout 400-B of the user interface 402 to identify and resolve the reported POG voids. The layout 400-B displays a filtered list 416a of newest POG void alerts, e.g., POG void alerts generated in the last 24 hours, since the last time the application was active, etc. Additionally or alternatively, the layout 400-B includes a reference 416b to a list of all POG void alerts related to the retail store 410. In certain instances, the filtered list 416a and the non-filtered list can be the same, such as when all active POG void alerts 414 associated with the retail store 410 are new.

The layout 400-B may include one or more POG void alert cards 418 that identify the product associated with the POG void alert, i.e., the product absent from its designated position on the planogram. In some instances, a number of the POG void alert cards 418 corresponds to the number of active POG void alerts 414a associated with the retail store 410. Each POG void alert card 418 identifies a product descriptor 420, such as a name, description, net weight, and a numeric or alphanumeric identifier (e.g., a stock-keeping unit (SKU), a universal product code (UPC), etc.). Additionally or alternatively, each POG void alert card 418 identifies a scannable barcode 422 associated with the product.

Figure 4C:
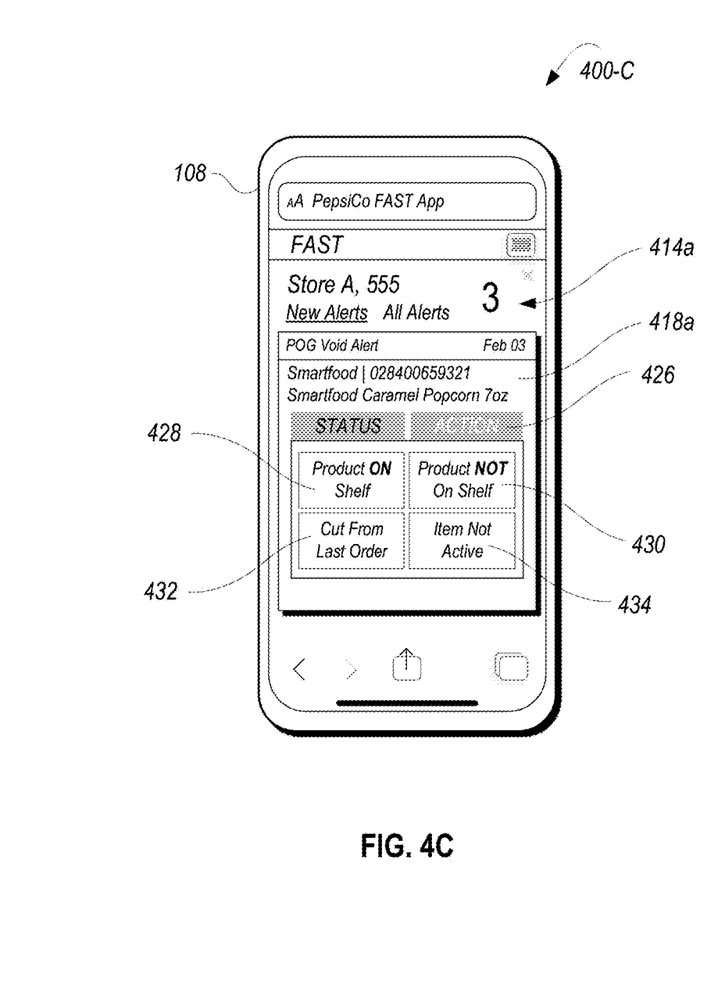

A status control 424 of the POG void alert card 418 is a key, button, or other user-activated control linked to a product status interface layout as discussed below in further detail (see, e.g., FIG. 4C). A product action control 426 of the POG void alert card 418 is a key, button, or another user-activated control linked to a product action interface layout as discussed below in further detail (see, e.g., FIG. 4D), FIG. 4C illustrates an exemplary layout 400-C of the product status control 424 for monitoring and resolving the POG void alerts. As with the layouts 400-A and 400-B, the layout 400-C may be rendered on the display 508 of the field device 108. The layout 400-C comprises status selection for the product associated with the POG void. For example, the layout 400-C may comprise a UI layout accessible through actuation of the status control 424 of the layout 400-B. Of course, in other embodiments, the layout 400-C may be navigated to by way of additional or alternative menu selections and/or invoked automatically in response to activation of the software application or when the field device 108 is detected to be in geographic proximity to the retail store where the POG void has been identified.

Status selections 428, 430, 432, and 434 are user-activated controls indicating a status of the product associated with the POG void alert. The status selections 428, 430, 432, and 434 may be mutually exclusive, such that the field agent can select only one of the status selections 428, 430, 432, and 434. In other examples, the status selections 428, 430, 432, and 434 are not mutually exclusive, such that the field agent can identify the status of the product by selecting simultaneously more than one of the status selections 428, 430, 432, and 434. While four status selections are depicted, it is contemplated that fewer or a greater number of status selections may be provided.

A first status selection 428 of the layout 400-C is associated with "Product On Shelf" status and indicates that the field agent observed the product on the shelf. A second status selection 430 of the layout 400-C is associated with "Product Not On Shelf" status and indicates that the field agent did not observe the product on the shelf. A third status selection 432 of the layout 400-C is associated with "Cut From Last Order" status and indicates that the field agent determined that the product is absent because it was not a part of a previous product order by the retailer. A fourth status selection 434 of the layout 400-C is associated with "Item Not Active" status and indicates that the field agent determined after analyzing the planogram and the display that the product no longer gets restocked.

The application receives user input (e.g., touch, speech, gesture, etc.) from the frontline agent that indicates whether an action has been taken regarding a given alert and/or the type of action that has been taken. The application transmits data associated with the received user input to the analytic device 104. The analytic device 104 processes the received user input and adapts conditions for setting POG void alert based on the received user input.

The analytic device 104 identifies authorized voids and issues a Direct Store Delivery (DSD) alert. The analytic device 104 sends a POG void alert to the field device 108 to validate the out-of-stock and re-order stock, if applicable. The analytic device 104 receives data indicating feedback by the field agent regarding the issued POG void alert and adapts conditions for setting subsequent POG void alerts based on the received feedback.

Figure 4D:
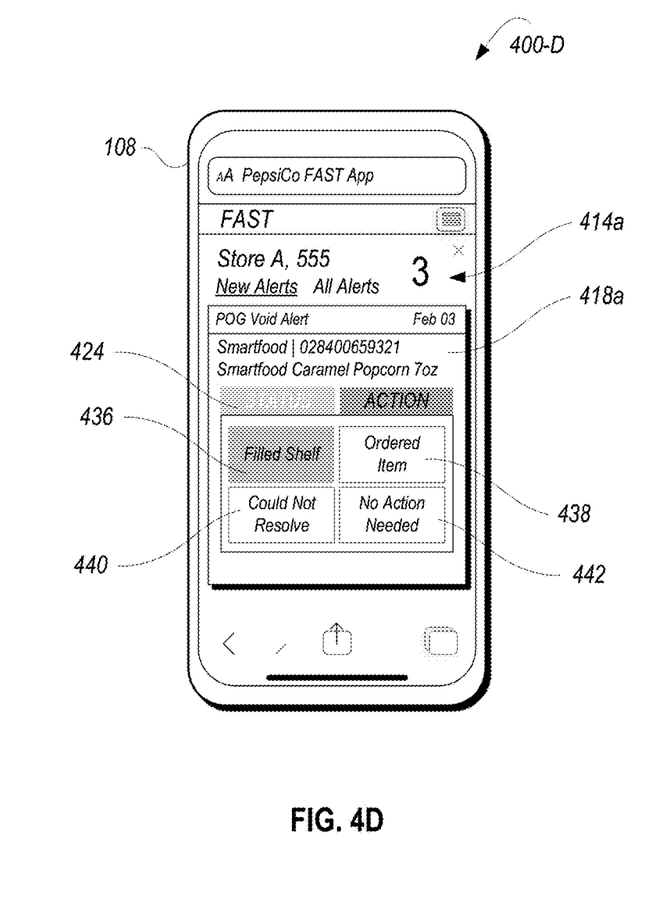

FIG. 4D illustrates an exemplary layout 400-D of the product action control 426 for monitoring and resolving the POG void alerts. The layout 400-D comprises an action selection for the product associated with the POG void. For example, the layout 400-D may comprise a UI layout accessible through actuation of the product action control 426 of the layouts 400-B and 400-C. Of course, in other embodiments, the layout 400-D may be navigated to by way of additional or alternative menu selections and/or invoked automatically in response to activation of the software application or when the field device 108 is detected to be in proximity to the retail store display where the POG void has been identified.

Action selections 436, 438, 440, and 442 are user-activated controls indicating an action taken by the field agent regarding the POG void alert. While four action selections are shown, it is contemplated that fewer or additional or other action selections may be provided. The action selections 436, 438, 440, and 442 may be mutually exclusive, such that the field agent can select only one of the action selections 436, 438, 440, and 442. In other examples, the action selections 436, 438, 440, and 442 are not mutually exclusive, such that the field agent can identify the action taken regarding the product by selecting simultaneously more than one of the action selections 436, 438, 440, and 442.

A first action selection 436 of the layout 400-D is associated with "Filled Shelf" action and indicates that the field agent confirmed that the POG void alert was accurate, the product needed to be restocked, and that the agent was able to do so immediately. A second action selection 438 of the layout 400-D is associated with "Ordered Item" action and indicates that the field agent confirmed that the POG void alert was accurate and the product needed to be restocked, but the agent was not able to do so immediately and, instead, placed an order for the item. A third action selection 440 of the layout 400-D is associated with "Could Not Resolve" action and indicates that the field agent determined that the POG void alert was accurate, but the agent was not able to resolve the identified void. A fourth action selection 442 of the layout 400-D is associated with "No Action Needed" action and indicates that the field agent determined that the POG void alert was inaccurate and no further action is needed.

For example, the analytic device 104 analyzes active POG voids by retailer and/or by region. As another example, the analytic device 104 analyzes POG void alert trends over time.

The analytic device 104 determines a percentage of serviceable POG voids, e.g., by determining a number of POG voids (empty positions of a planogram) as a share of all positions of the planogram. The analytic device 104 analyzes percentage POG void values by one of a serviceable zone, district, route, and retailer location.

Figure 7:
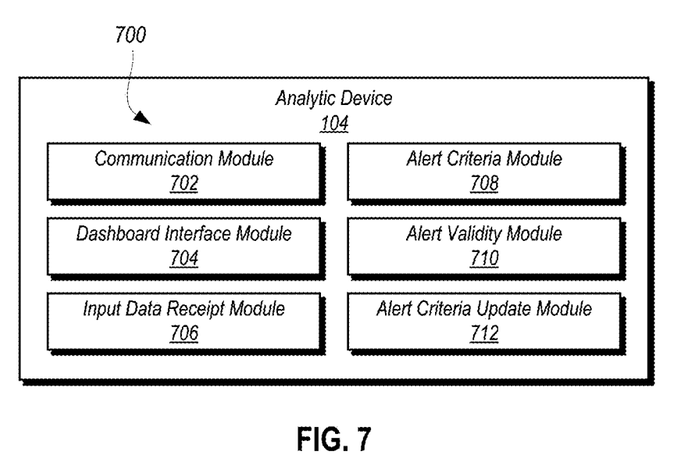
FIG. 7 is a block diagram of an environment created by the analytic device in the system of FIG. 1.

Referring now to FIG. 7, in use, the analytic device 104 establishes an environment 700. The illustrative environment 700 includes a communication module 702, a dashboard interface module 704, an input data receipt module 706, an alert criteria module 708, an alert validity module 710, and an alert criteria update module 712. Each of the modules and other components of the environment 700 may be embodied as firmware, software, hardware, or a combination thereof. For example the various modules, logic, and other components of the environment 700 may form a portion of, or otherwise be established by, the processor 204, the I/O subsystem 208, an SoC, or other hardware components of the analytic device 104. As such, in some embodiments, any one or more of the modules of the environment 700 may be embodied as a circuit or collection of electrical devices (e.g., a communication circuit, a user interface circuit, an input data receipt circuit, an alert criteria circuit, an alert validity circuit, an alert criteria update circuit, etc.).

The communication module 702 is configured to facilitate communications between the analytic device 104 and other devices of the system 100. For example, the communication module 702 may establish communication links, via the communication circuit 212, with one or more of the compute device 102, the data sources 106, and/or the field devices 108 to retrieve raw and processed inventory tracking data, generate POG void inventory alerts, receive and analyze user feedback regarding a previously generated POG void inventory alert, and update a criteria for setting subsequent POG void alerts.

The dashboard interface module 704 is configured to provide an interface to a user for interaction with the analytic device 104. For example, the dashboard interface module 704 may receive user input from the user interface of the dashboards 318.

The input data receipt module 706 is configured to receive, via the communication module 702, data from the data sources 106, such as, the internal data sources 308, the retailer provided data sources 310, the connected coolers 312, the IoT device 314, and other data sources 316. As described in reference to FIG. 3, the analytic device 104 may receive input data either, directly, from the data sources 106 themselves (may be referred to as, "raw data") and/or, indirectly, such as via the compute device 102 (may be referred to as, "processed data").

The alert criteria module 708 is configured to analyze input data to determine whether criteria for issuing a POG void alert for a certain retail or geographic location has been met. The alert criteria module 708 is communicatively coupled to the dashboard 318 and the field devices 108. Upon determining that one or more criteria for setting a POG void alert has been met, the alert criteria module 708 causes the field device 108 to update information rendered on the display 508, as discussed in more detail below. The alert criteria module 708 tracks various items or products according to a previously assigned category or type, such as fast-moving product, medium-moving product, or slow-moving product, where a fast-moving product is a high-demand product expected to sell large quantities (e.g., several dozen units) in a given period of time, a medium-moving product is a moderate-demand product expected to sell fewer quantities than the fast-moving product, and a slow-moving product a modest-demand product expected to sell fewer quantities than the medium-moving product. Alert criteria module 708 generates an alert, such as a POG void alert, in response to detecting that a quantity of a given fast-, medium-, or slow-moving product sold at a certain retail location or geographic area within a predefined period is greater than or less than a threshold quantity associated with the product category.

In an illustrative embodiment, alert criteria module 708 monitors the fast-, medium-, and slow-moving products over different time periods, such that a given quantity of a fast-moving product may be expected to be sold within a week, while the same quantity of a medium-moving product and a slow-moving product may be expected to sell within a period of two weeks and a month, respectively. Alert criteria module 708 generates an alert in response to the quantity of fast-, medium-, or slow-moving product sold at a certain retail or geographic location within an associated time period being greater than or less than a threshold quantity expected to have been sold. In another illustrative embodiment, alert criteria module 708 tracks different quantities of each of the fast-, medium-, and slow-moving products over different time periods and may expect to sell a first quantity of a fast-moving product within a first time period, a second quantity of a medium-moving product within a second time period, and a third quantity of a slow-moving product within a third time period. In such a scenario, alert criteria module 708 may generate a POG void alert, or another alert, for a product categorized as a fast-moving product in response to detecting that a quantity of the product sold within the first time period is greater than or less than the first quantity expected to have been sold.

The alert validity module 710 is configured to receive data indicating user input related to alert status and alert action for one or more previously generated POG void alerts. As described above, user feedback may be entered using one or more of the user interface 512 of the field device 108 and a touch screen connected to the display 508 of the field device 108. In an illustrative embodiment, the alert validity module 710 interprets data indicating the received user feedback regarding a previously generated POG void alert to determine whether the previously generated POG void alert was valid. The alert validity module 710 is communicatively connected to the alert criteria update module 712. In one example, upon determining from the received user feedback that the previously generated POG void alert is invalid, the alert validity module 710 sends, to the alert criteria update module 712, data associated with the previously generated POG void alert and/or data associated with the received user feedback regarding the previously generated POG void alert. At least some POG void alerts may be determined to be invalid because a product categorized as fast-moving in a first geographic area or a first retailer is less popular in a second geographic area or a second retailer, such that actual quantities sold as compared to the expected quantities may appear low more frequently in the second geographic area or at the second retailer. One or more POG void alerts may be determined to be invalid because the product may have been shifted, misplaced, or otherwise became inaccessible or appeared to be out of stock to the consumers. Further, some combination of these factors and/or additional or different factors may also cause an issued POG void alert to be invalid.

The alert criteria update module 712 is configured to receive, from the alert validity module 710, data associated with the previously generated POG void alert and/or data associated with the received user feedback regarding the previously generated POG void alert. The alert criteria update module 712 may process the received information to determine one or more updates to the criteria for setting the POG void alert. The alert criteria update module 712 may then communicate with the alert criteria module 708 to update one or more aspects of the criteria for setting the POG void alert. Following the criteria update, the alert criteria module 708 uses the updated criteria to identify and activate subsequent POG void alerts.

For POG void alerts determined to be invalid because a product is categorized as fast-moving in a first geographic area or a first retailer is less popular in a second geographic area or a second retailer, the alert criteria update module 712 may update the criteria for issuing the POG void alert for the product by changing its associated category or type for the second geographic area or the second retailer to a medium-moving product category. Under the updated criteria, the subsequent POG void alert for the product may be issued in response to detecting that the quantity of the product sold at the second retail location is fewer than the medium-moving product quantity expected to be sold. Instead of re-categorization, the alert criteria update module 712 may also resolve the invalid POG void alert resulting from differences in demand for the same product at different locations or retailers by decreasing the quantity expected to be sold and/or extending a period of time in which the quantity of product is expected to sell at a location with a lower demand.

For POG void alerts determined to be invalid because the product has been shifted, misplaced, or otherwise became inaccessible or appeared to be out of stock to the consumers, the alert criteria update module 712 may update the criteria for issuing the POG void alert for the product and/or the retail location by introducing additional verification parameters or thresholds prior to the issuance of a subsequent POG void alert. For example, in addition to the existing criteria for issuing the alert, the alert criteria update module 712 may request that a confirmation be made with several other data sources 106 that a product that appears absent has not simply been incorrectly shelved or otherwise misplaced.

Figure 8:
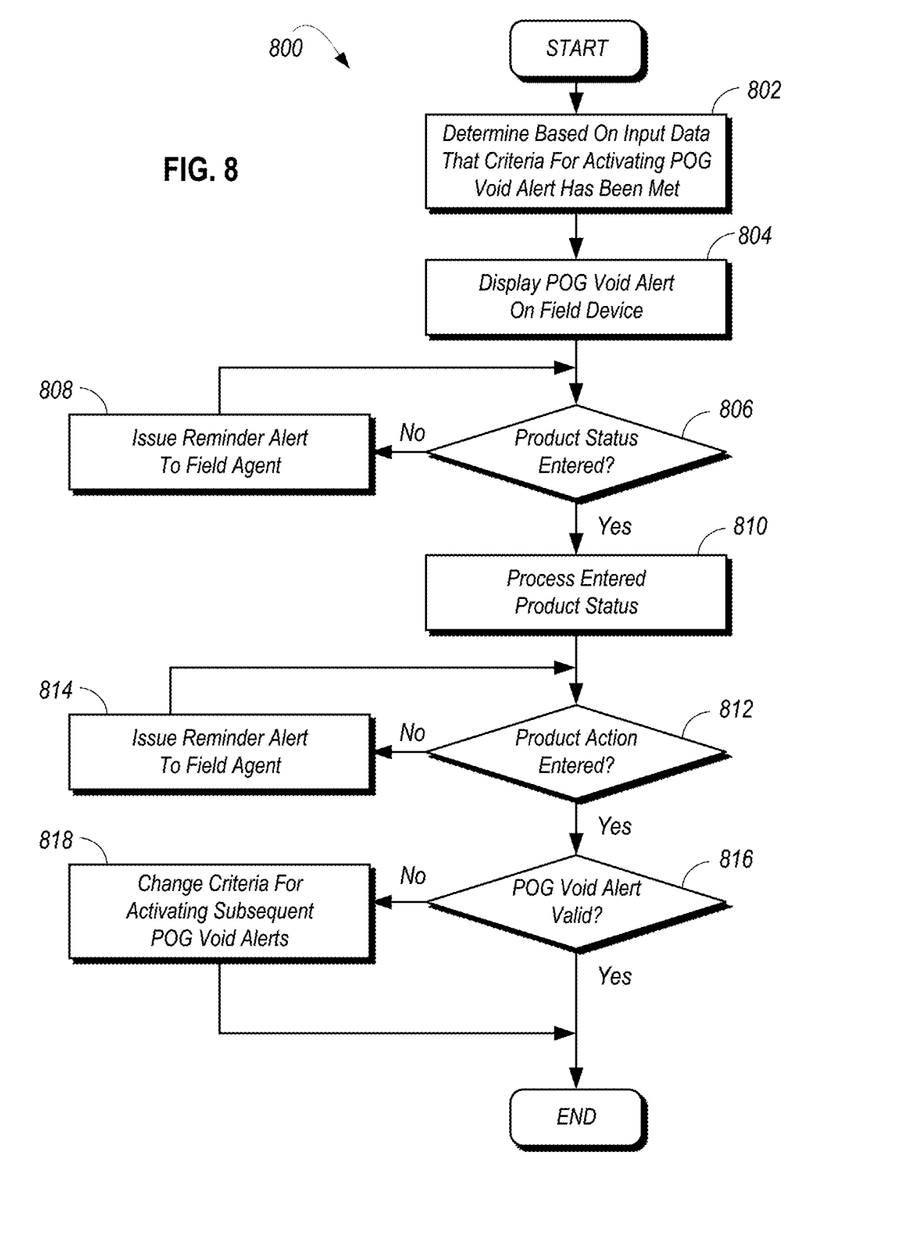
FIG. 8 is a block diagram illustrating an exemplary process flow for adapting issuance of a POG void alert based on received field agent feedback.

FIG. 8 illustrates an exemplary process 800 for updating criteria for setting POG void alerts. In some embodiments, the process 800 may be executed by the processor 204 using one or more modules of the analytic device 104 (e.g., the communication module 702, the dashboard interface module 704, the input data receipt module 706, the alert criteria module 708, the alert validity module 710, the alert criteria update module 712, etc.). The process 800 may begin at block 802 where the analytic device 104 determines, based on the input data from the data sources 106, that the criteria for setting a POG void alert has been met.

At block 804, the analytic device 104 causes the field device 108 to display the POG void alert to the field agent using the field device 108. The analytic device 104 determines, at block 806, whether a product status has been entered by the field agent with regard to the issued POG void alert. If the product status has not been entered, the analytic device 104, at block 808, causes a reminder to be displayed to the field agent on the field device 108. If the product status has been entered, the analytic device 104, at block 810, processes data indicating the entered product status.

The process 800 then proceeds to block 812 where the analytic device 104 determines whether the product action has been entered by the field agent with regard to the issued POG void alert. If the production action has not been entered, the analytic device 104, at block 814, causes a reminder to be displayed to the field agent on the field device 108.

If the product action has been entered, the analytic device 104, at block 816, processes data indicating the entered product action. For example, the analytic device 104 determines, based on the received feedback from the field agent, whether the issued POG void alert was valid. The analytic device 104 exits the process 800 in response to determining, based on the received feedback, that the issued POG void alert was valid.

In response to determining based on the received feedback that the issued POG void alert was invalid, the analytic device 104, at block 818, modifies criteria for setting subsequent POG void alerts. The process 800 may then end. In other examples, the process 800 may be repeated in response to a determination, by the analytic device 104, that the criteria for setting a subsequent POG void alert has been met or in response to a different determination or signal.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An inventory tracking system comprising:
an analytic device communicatively connected with a smart container at a predefined retail location, a plurality of data sources and a field device, wherein the plurality of data sources includes a plurality of sensors, wherein at least one of the sensors comprises a smart barcode that is associated with a product in the smart container, wherein the smart barcode is communicatively connected to the smart container, and wherein the smart container is configured to detect, based on signals of the smart barcodes, a quantity of products in the smart container and a change in the quantity of products in the smart container within a predefined verification period, and wherein the analytic device includes a processor configured to:
determine, based on input data from the smart container, whether a criteria for issuing a planogram (POG) void alert for a product in the smart container has been met,
in response to determining that the criteria for issuing the POG void alert for the product in the smart container has been met, operate a field device processor of the field device to display on a display of the field device a notification indicative of the POG void alert, a layout of the notification including a plurality of product action control icons, wherein the criteria for issuing the POG void alert for the product includes detecting, based on data from the smart container, that a quantity of products sold within the verification period at the retail location is fewer than a threshold quantity expected to be sold;
receive, from the field device processor, data corresponding to a selection by a user of at least one of the plurality of product action control icons, wherein the selection by the user of the at least one of the plurality of product action control icons indicates that an action with respect to the product associated with the issued POG void alert is unnecessary; and
in response to determining, based on the received data, that the issued POG void alert is invalid, update the criteria for setting the POG void alert, such that a subsequent POG void alert is issued according to the updated criteria, wherein determining that the issued POG void alert is invalid includes determining that the product has been shifted, misplaced, or otherwise became inaccessible or appeared to be out of stock to consumers of the product, and wherein to update the criteria for issuing the POG void alert for the product at the retail location includes introducing additional verification parameters or thresholds prior to the issuance of a subsequent POG void alert.

2. The system of claim 1, wherein the plurality of data sources comprise at least one of manufacturer-maintained inventory tracking data source, retailer-provided inventory tracking data source, and Internet of Things (IoT) device.

3. The system of claim 1, wherein the field device comprises a mobile device configured to provide at least one user interface for tracking product inventory.

4. The system of claim 1, wherein the criteria for issuing the POG void alert comprises one of detecting that a product is absent from a designated location of a display at a retail location.

5. The system of claim 4, wherein a category of the product is one of a fast-moving category, a medium-moving category, and a slow-moving category, wherein a first threshold quantity of the fast-moving products expected to be sold within the predefined verification period is greater than a second threshold quantity of the medium-moving products expected to be sold within the predefined verification period, and wherein the second threshold quantity is greater than a third threshold quantity of the slow-moving products expected to be sold within the predefined verification period.

6. The system of claim 5, wherein the category of the product is the fast-moving category, and wherein to update the criteria for issuing the POG void alert for the product comprises associating the threshold quantity expected to be sold with the second quantity, such that the subsequent POG void alert for the product is issued in response to detecting that the quantity of the product sold within the predefined verification period at the retail location is fewer than the second quantity.

7. The system of claim 4, wherein a category of the product is one of a fast-moving category, a medium-moving category, and a slow-moving category, and wherein a first verification period associated with the fast-moving product is shorter than a second verification period associated with the medium-moving product, and the second verification period is shorter than a third verification period associated with the slow-moving product.

8. The system of claim 7, wherein to the category of the product is the fast-moving category, and wherein to update the criteria for issuing the POG void alert for the product comprises associating the predefined verification period of the product with the second verification period, such that the subsequent POG void alert for the product is issued in response to detecting that the quantity of the product sold within the second verification period at the retail location is fewer than the threshold quantity expected to be sold.

9. A method comprising:
by a processor, determining, based on input data from at least one of a plurality of data sources, that a criteria for issuing a planogram (POG) void alert for a product at a predefined retail location has been met, wherein the at least one of the plurality of data sources includes a plurality of sensors, wherein at least one of the sensors comprises a smart barcode that is associated with a product in the smart container, wherein the smart container is communicatively connected to the smart container, and wherein the smart container is configured to detect, based on signals from the smart barcodes, a quantity of products at the retail location and a change in the quantity of products in the smart container within a predefined verification period,
by the processor, in response to determining that the criteria for issuing the POG void alert for the product at the smart container has been met, operating a field device processor of a field device to display on a display of the field device a notification indicative of the POG void alert, a layout of the notification including a plurality of product action control icons, wherein the criteria for issuing the POG void alert includes detecting, based on data from the smart container, that a quantity of products sold within the verification period at the retail location is fewer than a threshold quantity expected to be sold;
receiving, from the field device processor, data corresponding to a selection by a user of at least one of the plurality of product action control icons, wherein the selection by the user of the at least one of the plurality of product action control icons indicates that an action with respect to the product associated with the issued POG void alert is unnecessary; and
in response to determining, based on the received data, that the issued POG void alert is invalid, updating the criteria for issuing the POG void alert, such that a subsequent POG void alert is issued according to the updated criteria, wherein determining that the issued POG void alert is invalid includes determining that the product has been shifted, misplaced, or otherwise became inaccessible or appeared to be out of stock to consumers of the product, and wherein to update the criteria for issuing the POG void alert for the product at the retail location includes introducing additional verification parameters or thresholds prior to the issuance of a subsequent POG void alert.

10. The method of claim 9, wherein the plurality of data sources comprise at least one of manufacturer-maintained inventory tracking data source, retailer-provided inventory tracking data source, and Internet of Things (IoT) device.

11. The method of claim 9, wherein the criteria for issuing the POG void alert comprises one of detecting that a product is absent from a designated location of a display at a retail location.

12. The method of claim 11, wherein a category of the product is one of a fast-moving category, a medium-moving category, and a slow-moving category, wherein a first threshold quantity of the fast-moving products expected to be sold within the predefined verification period is greater than a second threshold quantity of the medium-moving products expected to be sold within the predefined verification period, and wherein the second threshold quantity is greater than a third threshold quantity of the slow-moving products expected to be sold within the predefined verification period.

13. The method of claim 12, wherein the category of the product is the fast-moving category, and wherein to update the criteria for issuing the POG void alert for the product comprises associating the threshold quantity expected to be sold with the second quantity, such that the subsequent POG void alert for the product is issued in response to detecting that the quantity of the product sold within the predefined verification period at the retail location is fewer than the second quantity.

14. The method of claim 11, wherein a category of the product is one of a fast-moving category, a medium-moving category, and a slow-moving category, wherein a first verification period associated with the fast-moving product is shorter than a second verification period associated with the medium-moving product, and the second verification period is shorter than a third verification period associated with the slow-moving product.

15. The method of claim 14, wherein to the category of the product is the fast-moving category, and wherein to update the criteria for issuing the POG void alert for the product comprises associating the predefined verification period of the product with the second verification period, such that the subsequent POG void alert for the product is issued in response to detecting that the quantity of the product sold within the second verification period at the retail location is fewer than the threshold quantity expected to be sold.

16. A field device comprising:
a field device display; and
a field device processor communicatively connected to the field device display to detect input of a user received via the field device display, the field device processor being communicatively connected to an analytic device in communication with at least one of a plurality of sensors, wherein at least one of the sensors comprises a smart barcode that is associated with a product in a smart container, wherein the smart barcode is communicatively connected to the smart container, and wherein the smart container is configured to detect, based on signals from the smart barcodes, a quantity of products in the smart container and a change in the quantity of products in the smart container within a predefined verification period, and the field device processor being configured to:
in response to receiving data indicating issuance of a planogram (POG) void alert based on an initial criteria for setting the POG void alert, display on the field device display a first notification of the issued POG void alert, a layout of the first notification including a plurality of product action control icons, wherein the initial criterial for setting the POG void alert is for a product at the retail location, and wherein the initial criteria for issuing the POG void alert for the product includes detecting, by the sensor, that a quantity of the products sold within the verification period at the retail location is fewer than a threshold quantity expected to be sold;
detect a selection by a user of at least one of the plurality of product action control icons, wherein the selection by the user of the at least one of the plurality of product action control icons indicates that an action with respect to the product associated with the issued POG void alert is unnecessary;
in response to the selection indicating that the issued POG void alert is invalid, transmit data indicative of the selection to a remote analytic device to operate the remote analytic device to update the initial criteria for setting the POG void alert to generate an updated criteria of setting the POG void alert, wherein determining that the issued POG void alert is invalid includes determining that the product has been shifted, misplaced, or otherwise became inaccessible or appeared to be out of stock to consumers of the product, and wherein to update the criteria for issuing the POG void alert for the product at the retail location includes introducing additional verification parameters or thresholds prior to the issuance of a subsequent POG void alert; and
in response to receiving data indicating issuance of a subsequent POG void alert based on the updated criteria, display on the field device display a second notification of the subsequent issued POG void alert.

17. The field device of claim 16, wherein the processor is further configured to, prior to the receiving of data indicating issuance of the POG void alert, initiate a setup procedure to establish a predefined geographic area of responsibility of the user, and wherein the issued POG void alert and the subsequent issued POG void alert are related to at least one retail location within the predefined geographic area.

18. The field device of claim 17, wherein a first one of the retail locations associated with the issued POG void alert and a second one of the retail locations associated with the subsequent POG void alert are same.

* * * * *